(12) United States Patent
Iwamoto et al.

(10) Patent No.: US 11,016,502 B1
(45) Date of Patent: May 25, 2021

(54) AUTONOMOUS TRAVEL SYSTEM

(71) Applicant: SHARP KABUSHIKI KAISHA, Sakai (JP)

(72) Inventors: Takashi Iwamoto, Sakai (JP); Masahiro Sakakibara, Sakai (JP); Takahiro Ueno, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 313 days.

(21) Appl. No.: 16/327,600

(22) PCT Filed: Aug. 24, 2017

(86) PCT No.: PCT/JP2017/030317
§ 371 (c)(1),
(2) Date: Feb. 22, 2019

(87) PCT Pub. No.: WO2018/038206
PCT Pub. Date: Mar. 1, 2018

(30) Foreign Application Priority Data

Aug. 26, 2016 (JP) .............................. JP2016-165371

(51) Int. Cl.
*G05D 1/02* (2020.01)
*G05D 1/00* (2006.01)

(52) U.S. Cl.
CPC .......... *G05D 1/0276* (2013.01); *G05D 1/0088* (2013.01); *G05D 1/0212* (2013.01); *G05D 1/0268* (2013.01)

(58) Field of Classification Search
CPC .. G05D 1/0276; G05D 1/0088; G05D 1/0212; G05D 1/268

USPC .......................................................... 701/23
See application file for complete search history.

(56) References Cited

U.S. PATENT DOCUMENTS

| | | | | |
|---|---|---|---|---|
| 9,014,902 B1* | 4/2015 | Murphy | ................. | G01C 21/00 701/26 |
| 2006/0064212 A1* | 3/2006 | Thorne | ................. | G05D 1/0246 701/23 |
| 2014/0100723 A1* | 4/2014 | O'Halloran | .......... | G05D 1/0265 701/19 |

(Continued)

FOREIGN PATENT DOCUMENTS

| JP | 2000-010632 A | 1/2000 |
|---|---|---|
| JP | 2003-216239 A | 7/2003 |
| JP | 2004-126718 A | 4/2004 |

*Primary Examiner* — Yazan A Soofi
(74) *Attorney, Agent, or Firm* — ScienBiziP, P.C.

(57) ABSTRACT

There is provided an autonomous travel system with which a travel route of an autonomous travel device can be easily set.
The autonomous travel system includes an autonomous travel device (2), a line (1) for guiding travel that is placed on a travel route traveled by the autonomous travel device (2), and a marker (3) that is placed on the travel route. To the marker (3), operation control information related to an operation of the autonomous travel device (2) is recorded so as to be readable. The autonomous travel device (2) includes a detection unit (line sensor (21)) that detects the line (1), an acquisition unit (detection sensor (22)) that acquires the operation control information from the marker (3), and a control unit (23) that controls an operation of the autonomous travel device (2) on the basis of a detection result from the detection unit and the operation control information acquired by the acquisition unit.

2 Claims, 9 Drawing Sheets

(56) References Cited

U.S. PATENT DOCUMENTS

2019/0187699 A1\* 6/2019 Salour ................. G05D 1/0246
2021/0018926 A1\* 1/2021 Lee ..................... G05D 1/0088

\* cited by examiner

FIG. 6 <PREDETERMINED-OPERATION CONTROL>

AUTONOMOUS TRAVEL SYSTEM

TECHNICAL FIELD

One embodiment of the present invention relates to a technique for allowing an autonomous travel device to travel along a line for guiding travel.

BACKGROUND ART

In an existing autonomous travel system, a magnetic tape for guiding travel is affixed on a route that is traveled by an autonomous travel device and the autonomous travel device moves along the magnetic tape while detecting the magnetic tape. PTL 1 discloses a technique in which a marker is placed on the floor face on a route and an autonomous travel device is stopped at a predetermined position when detecting the marker.

CITATION LIST

Patent Literature

PTL 1: Japanese Unexamined Patent Application Publication No. 2000-10632

SUMMARY OF INVENTION

Technical Problem

There has been a demand for moving an autonomous travel device along a predetermined travel route while causing the autonomous travel device to sequentially perform various operations. To meet such a demand, it is necessary to create a complex operation program in which positions on the travel route at which the operations are to be performed, the order and timings of the operations, etc. are written and to cause the autonomous travel device to execute the operation program.

However, in a case of controlling the travel of the autonomous travel device with the operation program, the operation program needs to be recreated each time the travel route is changed, which is troublesome to the user.

An object of one embodiment of the present invention is to provide an autonomous travel system with which a travel route of an autonomous travel device can be easily set.

Solution to Problem

An autonomous travel system according to one embodiment of the present invention includes an autonomous travel device, a line for guiding travel that is placed on a travel route traveled by the autonomous travel device, and a marker that is placed on the travel route. To the marker, operation control information related to an operation of the autonomous travel device is recorded so as to be readable. The autonomous travel device includes a detection unit that detects the line, an acquisition unit that acquires the operation control information from the marker, and a control unit that controls an operation of the autonomous travel device on the basis of a detection result from the detection unit and the operation control information acquired by the acquisition unit.

Advantageous Effects of Invention

With the autonomous travel system according to one embodiment of the present invention, the travel route of the autonomous travel device can be easily set.

DESCRIPTION OF EMBODIMENTS

An autonomous travel system according to one embodiment of the present invention includes an autonomous travel device, a line for guiding travel that is placed on a travel route traveled by the autonomous travel device, and a marker that is placed on the travel route. To the marker, operation control information related to an operation of the autonomous travel device is recorded so as to be readable. The autonomous travel device includes a detection unit that detects the line, an acquisition unit that acquires the operation control information from the marker, and a control unit that controls an operation of the autonomous travel device on the basis of a detection result from the detection unit and the operation control information acquired by the acquisition unit.

With the autonomous travel system described above, with simple work of placing the marker on the line, the travel route of the autonomous travel device in the line can be easily set. Even in a case where the travel route needs to be changed, the travel route can be easily changed by, for example, changing or adding the marker. Even in a case where the line is partially changed, the travel route can be easily set or changed in accordance with the change in the line by adding or changing the marker.

In the autonomous travel system described above, it is preferable that the autonomous travel device further include a storage unit that stores operation patterns and pieces of operation control information including the operation control information in association with each other. It is preferable that the control unit read from the storage unit an operation pattern, among the operation patterns, associated with the operation control information acquired by the acquisition unit, and control the operation of the autonomous travel device on the basis of the operation pattern. With this configuration, an operation program that covers the entire travel route need not be stored but only simple information in which the operation patterns and the pieces of operation control information are associated with each other need to be stored on the autonomous travel device. The operation control information recorded to the marker need not be complex information and may be information having a small data amount, such as a number, a symbol, etc. for identification.

In the autonomous travel system described above, it is preferable that the marker be a communication tag to which the operation control information is recorded, and that the acquisition unit communicate with the communication tag while the autonomous travel device is traveling, and acquire the operation control information recorded to the communication tag. With this configuration, the acquisition unit and the marker can communicate with each other during a certain period in which the autonomous travel device passes through the vicinity of the marker. Therefore, even while the autonomous travel device is traveling, the operation control information recorded to the marker can be acquired with high accuracy. Further, even if the operation control information is complex to some extent, the information can be easily read via communication.

In the autonomous travel system described above, it is preferable that the control unit enter a preparatory state when the acquisition unit acquires the operation control information, and perform detection control for detecting a predetermined position at which the autonomous travel device is caused to perform a predetermined operation based on the operation control information. It is preferable that, in a case where the control unit detects the predetermined position with the detection control while the control unit is in the preparatory state, the control unit control the operation of the autonomous travel device on the basis of the operation control information acquired when the control unit enters the preparatory state. With this configuration, the predetermined position can be detected with high accuracy with the detection control. Therefore, when the predetermined position is set to a position desired by the user, it is possible to cause the autonomous travel device to perform the predetermined operation precisely at the desired position.

It is preferable that, in the detection control, the control unit determine a width of the line on the basis of a detection result from the detection unit and, in a case where the determined width of the line is equal to or larger than a predetermined reference width, detect a position at which the autonomous travel device is located when the width of the line is determined to be equal to or larger than the predetermined reference width as the predetermined position. With this configuration, the predetermined position can be detected with high accuracy with the detection control.

In the autonomous travel system described above, the line may include two lines that are placed on the travel route so as to extend in different directions and to intersect at a point of intersection, and the marker may include a plurality of markers that are placed within a predetermined area including the point of intersection. In such a configuration, it is preferable that, when the autonomous travel device passes through the point of intersection, the control unit perform the following control. First, the control unit controls the operation of the autonomous travel device on the basis of the operation control information acquired first by the acquisition unit from one of the plurality of markers placed within the predetermined area. Thereafter, the control unit ignores the operation control information acquired by the acquisition unit from another of the plurality of markers placed within the predetermined area until the autonomous travel device passes through and leaves the predetermined area. With this configuration, an erroneous operation of the autonomous travel device that passes through the point of intersection can be prevented.

Hereinafter, embodiments will be described in detail.

[1] First Embodiment

Figure 1:
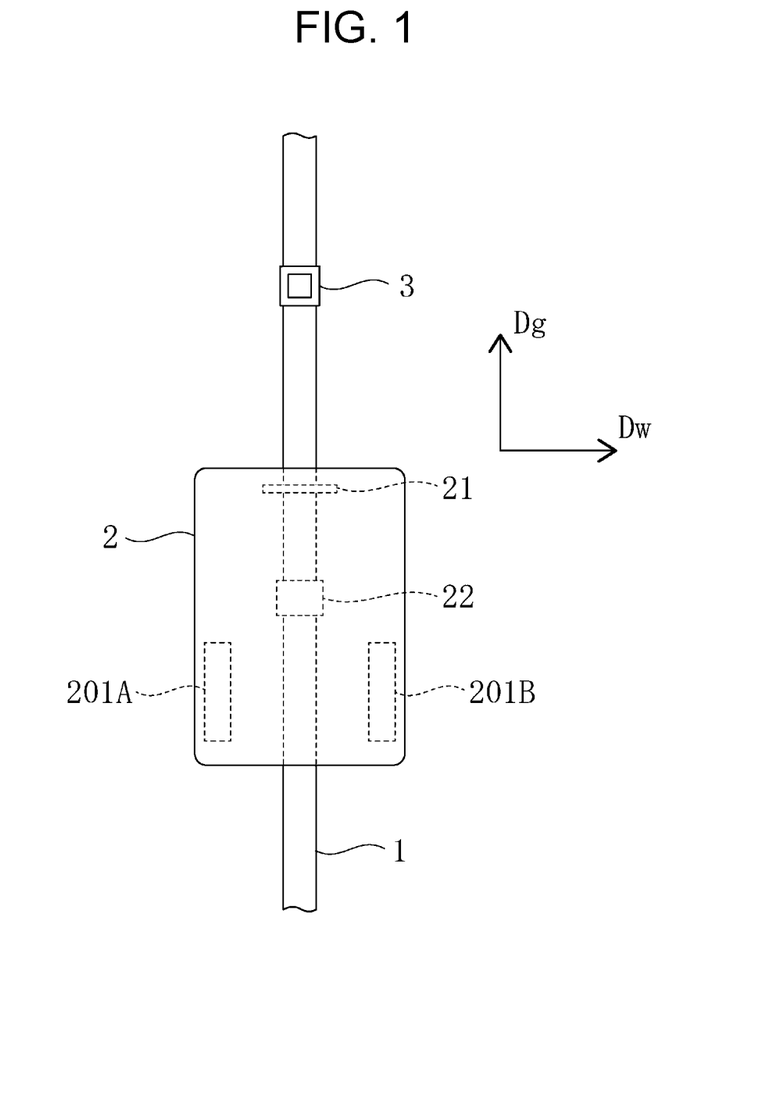
FIG. 1 is a schematic diagram illustrating an autonomous travel system according to a first embodiment.

FIG. 1 is a schematic diagram illustrating an autonomous travel system according to a first embodiment. As illustrated in FIG. 1, the autonomous travel system includes a line 1 for guiding travel, an autonomous travel device 2 that travels along the line 1, and a marker 3.

[1-1] Line

The line 1 is placed on a travel route that is traveled by the autonomous travel device 2 and, in this embodiment, is formed of a magnetic tape that is affixed to the travel route.

[1-2] Marker

To the marker 3, operation control information related to an operation of the autonomous travel device 2 is recorded so as to be readable. The marker 3 is placed on the travel route and used. In this embodiment, the marker 3 is laid on the line 1. As the marker 3, an RFID (radio-frequency identifier), which is a communication tag, is used. The marker 3 may be placed at a position distant from the line 1 by a predetermined distance. As the marker 3, various communication tags other than an RFID may be used.

[1-3] Autonomous Travel Device

Figure 2:
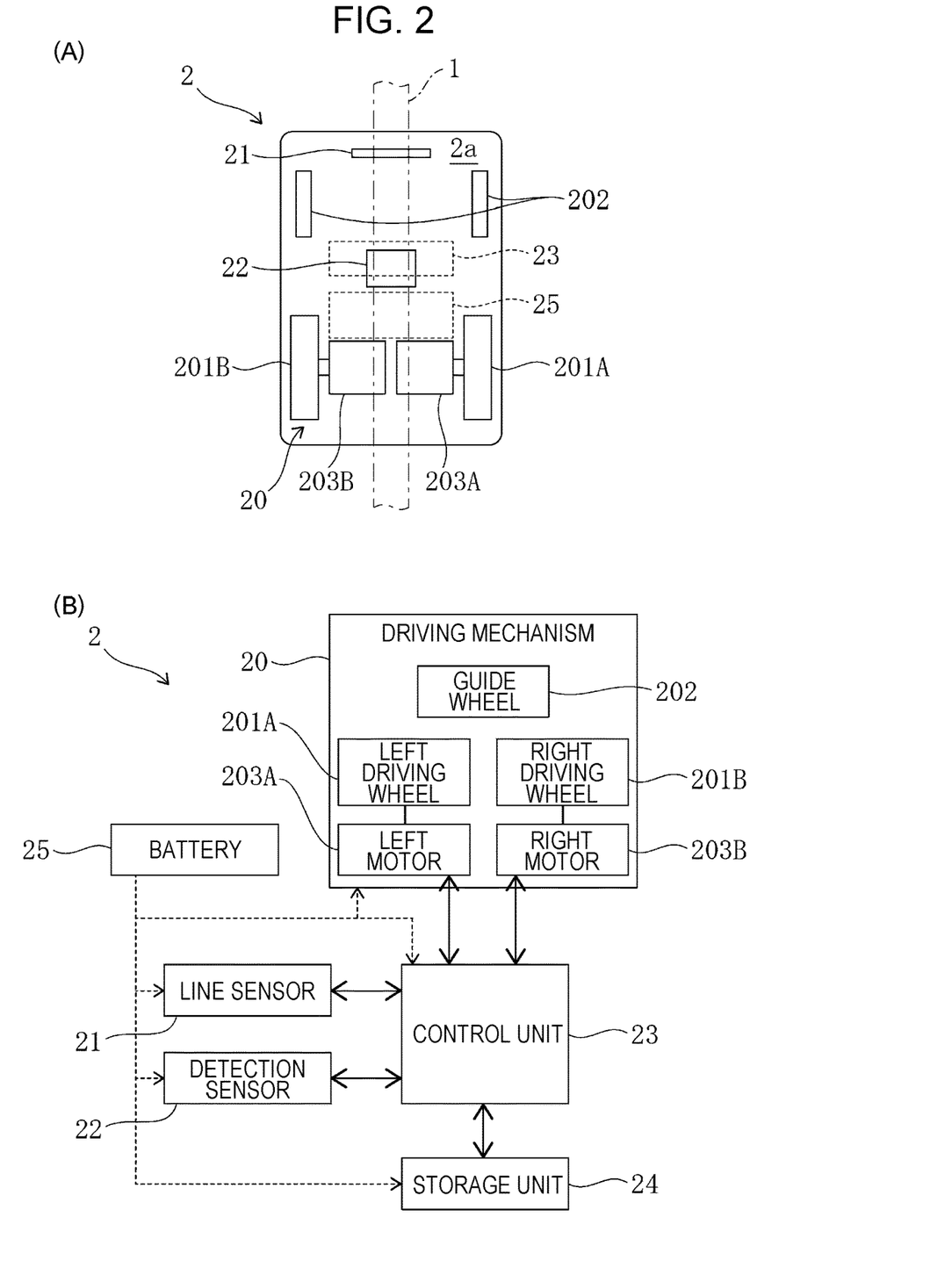
FIG. 2(A) is a bottom view of an autonomous travel device included in the autonomous travel system.
FIG. 2(B) is a block diagram illustrating a configuration of the autonomous travel device.

FIG. 2(A) is a bottom view of the autonomous travel device 2, and FIG. 2(B) is a block diagram illustrating a configuration of the autonomous travel device 2. As illustrated in FIGS. 2(A) and 2(B), the autonomous travel device 2 includes a driving mechanism 20 that is responsible for moving forward, moving backward, turning, and other operations, a line sensor 21 (corresponding to "detection unit" in the claims) that detects the line 1, a detection sensor 22 (corresponding to "acquisition unit" in the claims) that senses the marker 3 placed on the travel route, a control unit 23 that controls an operation of the autonomous travel device 2, a storage unit 24, and a battery 25 that supplies power to the units.

<Driving Mechanism>

The driving mechanism 20 includes a left driving wheel 201A, a right driving wheel 201B, guide wheels 202 that support the autonomous travel device 2 together with the driving wheels, a left motor 203A that rotates the left driving wheel 201A, and a right motor 203B that rotates the right driving wheel 201B. The left motor 203A and the right motor 203B can be controlled independently of each other, and the rotation directions and rotation speeds thereof are controlled by the control unit 23 in association with each other. The terms "left" and "right" are used with reference to a direction of travel Dg of the autonomous travel device 2 in plan view (FIG. 1) of the autonomous travel device 2.

<Line Sensor>

Figure 3:
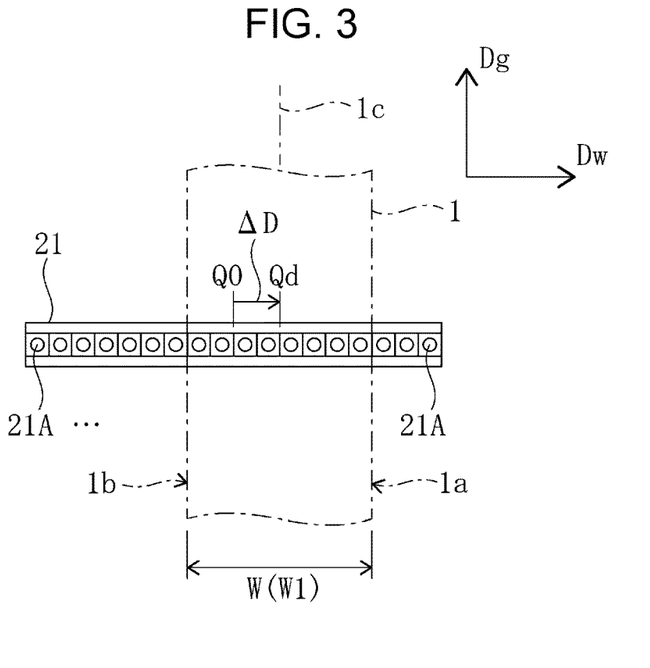
FIG. 3 is an enlarged view of a line sensor included in the autonomous travel device.

FIG. 3 is an enlarged view of the line sensor 21. The line sensor 21 is provided on a bottom surface 2a of the autonomous travel device 2 (see FIG. 2(A)) and is formed of a plurality of detecting elements 21A that are arranged in line in a direction orthogonal to the direction of travel Dg of the autonomous travel device 2 (that is, a direction that substantially matches a width direction Dw of the line 1 at the time of travel), as illustrated in FIG. 3. Specifically, each of the detecting elements 21A is an element that outputs a detection signal in a case where the element is at a position at which the element faces the line 1. In this embodiment, each of the detecting elements 21A is a Hall element and, when facing the line 1 (magnetic tape), detects magnetism of the line 1 and outputs a detection signal (for example an ON signal).

More specifically, the number of the detecting elements 21A and intervals at which the detecting elements 21A are arranged are set so that the width of the line sensor 21 is larger than a normal width W1 of the line 1 or so that edges 1a and 1b on the respective sides of the line 1 in the width direction Dw can be detected. Therefore, when the autonomous travel device 2 travels, a number of the detecting elements 21A corresponding to the width of the line 1 face the line 1 and output detection signals. That is, detection signals from the detecting elements 21A as described above are output as a detection result from the line sensor 21.

<Detection Sensor>

The detection sensor 22 senses the marker 3 placed on the travel route and acquires operation control information recorded to the marker 3. Specifically, the detection sensor 22 communicates with the marker 3 while the autonomous travel device 2 is traveling and acquires operation control information recorded to the marker 3. In this embodiment, the detection sensor 22 is placed at a position such that the detection sensor 22 can face the marker 3 when the autonomous travel device 2 travels. To correspond to an RFID that is used as the marker 3, an RFID sensor that can communicate with the RFID is used as the detection sensor 22. The detection sensor 22 may be placed at a position apart from the position at which the detection sensor 22 faces the marker 3 as long as the detection sensor 22 can communicate with the marker 3. The detection sensor 22 can be changed as appropriate in accordance with the type of communication tag used as the marker 3.

<Control Unit>

The control unit 23 controls an operation of the autonomous travel device 2 on the basis of the detection result from the line sensor 21 and the operation control information acquired by the detection sensor 22. The operation of the autonomous travel device 2 includes a travel operation of traveling along the line 1 and predetermined operations that are preset operations and different from the travel operation. The details of the predetermined operations will be described below.

Figure 4:
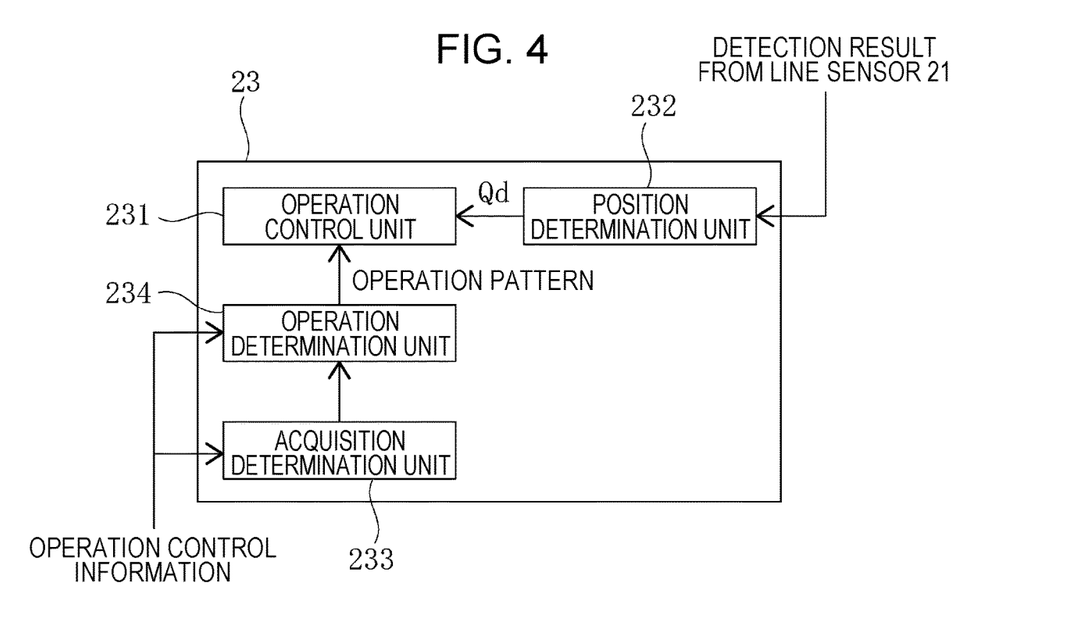
FIG. 4 is a block diagram illustrating a configuration of a control unit included in the autonomous travel device.

FIG. 4 is a block diagram illustrating a configuration of the control unit 23. As illustrated in FIG. 4, the control unit 23 includes an operation control unit 231, a position determination unit 232, an acquisition determination unit 233, and an operation determination unit 234. The units in the control unit 23 perform processes to thereby perform travel-operation control and predetermined-operation control described below. As the control unit 23, a CPU (central processing unit), a microcomputer, or any other control processing unit can be employed. The processes performed in the control unit 23 may be performed on the basis of a series of corresponding computer programs. The computer programs may be stored in a recording medium (for example, a flash memory) so as to be readable or may be stored in the storage unit 24.

<Storage Unit>

The predetermined operations of the autonomous travel device 2 are set in advance as operation patterns, and the operation patterns and pieces of operation control information are stored in the storage unit 24 in association with each other. As the storage unit 24, for example, a flash memory or an HDD (hard disk drive) is used.

Examples of the operation patterns (predetermined operations) are listed in Table 1 below. The operation patterns may include an operation pattern that is a combination of various operations including moving forward as listed in Table 1 or may include an operation pattern that is formed of a single operation, such as stopping, turning clockwise, turning counterclockwise, changing the speed, raising or lowering the tractor arm, moving backward by a predetermined distance, etc.

As listed in Table 1, the operation patterns and pieces of operation control information (in Table 1, designated numbers) used to specify an operation pattern that is desired to be executed by the autonomous travel device 2 are stored in the storage unit 24 in association with each other. The operation patterns (predetermined operations) to be executed by the autonomous travel device 2 are not limited to those related to travel of the autonomous travel device 2 and can include various operations, such as a linked operation with a power supply unit or a conveyor, a linked operation with a trolley, etc.

TABLE 1

| No. | Operation Pattern |
|---|---|
| 1 | Stops and restarts traveling in response to pressing of the travel switch. |
| 2 | Stops, and immediately thereafter, restarts traveling. |
| 3 | Turns counterclockwise (180° at maximum), and thereafter, starts traveling. |
| 4 | Turns clockwise (180° at maximum), and thereafter, starts traveling. |
| 5 | Stops and restarts traveling in 20 seconds. |
| 6 | Stops, raises the tractor arm, and thereafter, restarts traveling. |
| 7 | Stops, lowers the tractor arm, and thereafter, restarts traveling. |
| 8 | Stops, raises the tractor arm in response to pressing of the travel switch, and thereafter, restarts traveling. |
| 9 | Stops, lowers the tractor arm, and restarts traveling in response to pressing of the travel switch. |
| 10 | Stops, raises or lowers the tractor arm in accordance with the position of the tractor arm, and thereafter, restarts traveling. |
| 11 | Moves backward by a predetermined distance, turns counterclockwise (180° at maximum), and thereafter, starts traveling. |
| 12 | Moves backward by a predetermined distance, turns clockwise (180° at maximum), and thereafter, starts traveling. |
| 13 | Changes the travel speed (switches to 10 m/min.). |
| 14 | Changes the travel speed (switches to 20 m/min.). |
| 15 | Changes the travel speed (switches to 40 m/min.). |
| 16 | Changes the travel speed (switches to 80 m/min.). |
| 17 | Switches the obstacle sensing area number. |
| 18 | Changes the distance (the above-described predetermined distance) for moving backward (predetermined distance = 0 to 200 cm). |

As described below, at the time of operation control, an operation pattern that corresponds to operation control information acquired by the detection sensor 22 is read from the storage unit 24. Therefore, an operation program that covers the entire travel route (a complex operation program in which positions on the travel route at which operations are to be performed, the order and timings of the operations, etc. are written) need not be stored but only simple information in which the operation patterns and the pieces of operation control information are associated with each other need to be stored on the autonomous travel device 2. The operation control information recorded to the marker 3 need not be complex information and may be information having a small data amount, such as a number, a symbol, etc. for identification.

The operation patterns need not be stored in the storage unit 24 in association with the pieces of operation control information, and an operation pattern may be recorded to the marker 3 as is as operation control information. In this case, the autonomous travel device 2 (the storage unit 24) need not store the information in which the pieces of operation control information and the operation patterns are associated with each other. Further, the operation control information becomes complex but is simpler than the operation program that covers the entire travel route.

[1-4] Control Method (1) Travel-Operation Control

Figure 5:
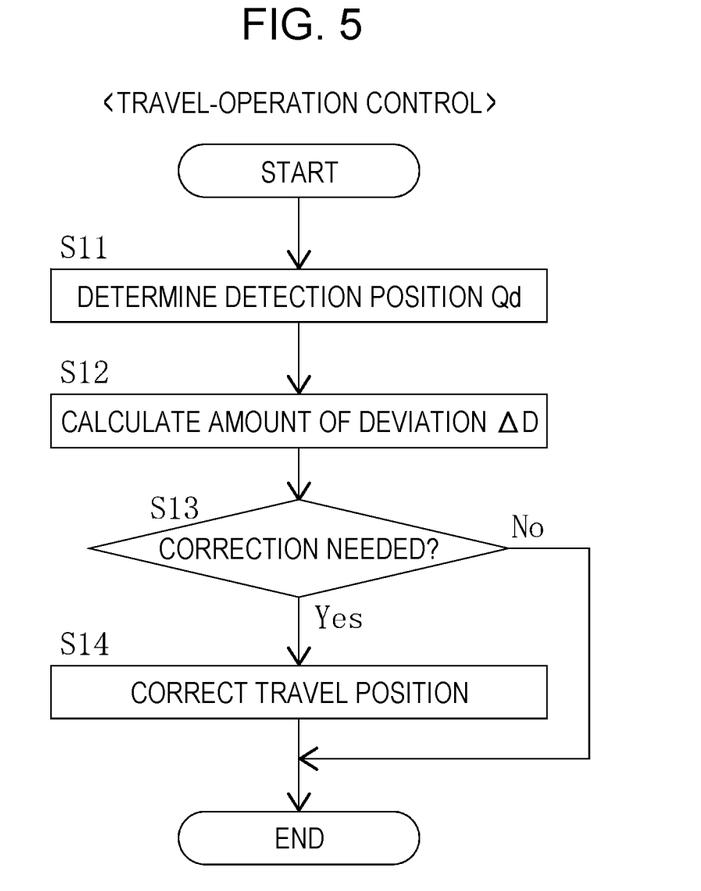
FIG. 5 is a flowchart illustrating a flow of travel-operation control performed by the control unit.

In a case where the detection sensor 22 does not acquire operation control information, the control unit 23 controls the autonomous travel device 2 so as to travel along the line 1. In the travel-operation control, the control unit 23 causes the autonomous travel device 2 to travel along the line 1 while controlling the travel position of the autonomous travel device 2 in the width direction Dw of the line 1. Specifically, the control unit 23 performs the following control. FIG. 5 is a flowchart illustrating a flow of the travel-operation control performed by the control unit 23.

First, the operation control unit 231 controls rotation of each of the left motor 203A and the right motor 203B to cause the autonomous travel device 2 to travel. While the autonomous travel device 2 is traveling, the position determination unit 232 determines a detection position Qd, in the line sensor 21, at which the line 1 is detected on the basis of a detection result from the line sensor 21 (detection signals from the detecting elements 21A) (step S1). Specifically, the position determination unit 232 determines the detection position Qd on the basis of the positions of the detecting elements 21A, in the line sensor 21, outputting detection signals.

For example, the detection position Qd corresponds to a center line 1c of the line 1 (see FIG. 3). In this case, the detection position Qd is determined from two positions, that is, the positions of the detecting elements 21A at the respective ends among the detecting elements 21A that output detection signals. For example, the middle point between the two positions is determined to be the detection position Qd. For example, the detection position Qd may correspond to the edge 1a or 1b of the line 1 (see FIG. 3). In this case, the detection position Qd is determined from the position of the detecting element 21A at the left end or the right end among the detecting elements 21A that output detection signals.

Next, the operation control unit 231 controls the travel position of the autonomous travel device 2 in the width direction Dw of the line 1 on the basis of the detection position Qd determined by the position determination unit 232 while causing the autonomous travel device 2 to travel along the line 1. Specifically, the operation control unit 231 calculates the amount of deviation ΔD of the detection position Qd from a predetermined position Q0 in the line sensor 21 (see FIG. 3) (step S12). Thereafter, the operation control unit 231 determines whether the travel position needs to be corrected (Yes or No) on the basis of the amount of deviation ΔD (step S13). Specifically, the operation control unit 231 determines whether the absolute value of the amount of deviation ΔD is larger than a predetermined value d0, which is the upper limit of the tolerance.

If the determination by the operation control unit 231 results in Yes (the travel position needs to be corrected) in step S13, the operation control unit 231 controls rotation of each of the left motor 203A and the right motor 203B to move the autonomous travel device 2 rightward or leftward so that the absolute value of the amount of deviation ΔD is equal to or smaller than the predetermined value d0 (step S14). On the other hand, if the determination by the operation control unit 231 results in No (the travel position need not be corrected) in step S13, the operation control unit 231 does not change rotation of each of the left motor 203A and the right motor 203B but maintains the states of the left motor 203A and the right motor 203B at that time. The process from step S11 to step S14 is repeatedly performed during the travel operation.

(2) Predetermined-Operation Control

Figure 6:
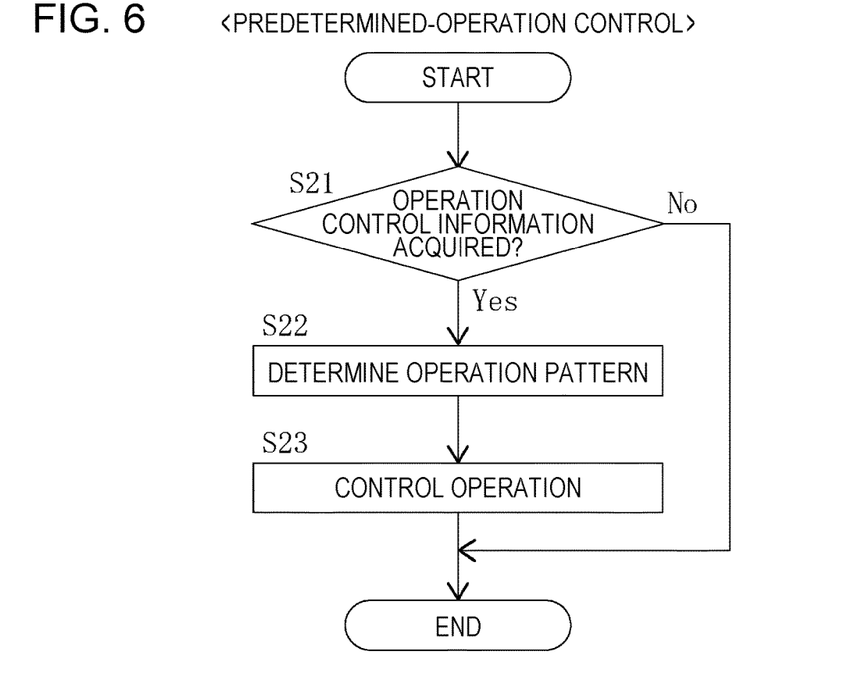
FIG. 6 is a flowchart illustrating a flow of predetermined-operation control performed by the control unit.

In a case where the detection sensor 22 acquires operation control information, the control unit 23 performs control to cause the autonomous travel device 2 to perform a predetermined operation. The predetermined-operation control is performed simultaneously with the travel-operation control described above. In the predetermined-operation control, the control unit 23 controls the operation of the autonomous travel device 2 on the basis of the operation control information acquired from the marker 3 to thereby cause the autonomous travel device 2 to perform a predetermined operation. Specifically, the control unit 23 performs the following control. FIG. 6 is a flowchart illustrating a flow of the predetermined-operation control performed by the control unit 23.

The acquisition determination unit 233 determines whether the detection sensor 22 acquires operation control information while the autonomous travel device 2 is traveling (Yes or No) (step S21). If the determination by the acquisition determination unit 233 results in Yes (the detection sensor 22 acquires operation control information) in step S21, the operation determination unit 234 determines an operation pattern to be executed by the autonomous travel device 2 on the basis of the operation control information (step S22). Specifically, the operation determination unit 234 reads from the storage unit 24 an operation pattern that corresponds to the operation control information acquired by the detection sensor 22.

Next, the operation control unit 231 controls the operation of the autonomous travel device 2 on the basis of the operation pattern determined by the operation determination unit 234 (step S23).

With the above-described autonomous travel system according to the first embodiment, it is possible to cause the autonomous travel device 2 to read operation control information from the marker 3 in a sequential manner and, each time the operation control information is read, cause the autonomous travel device 2 to execute an operation pattern (predetermined operation) that corresponds to the operation control information. When the operation control information is read (acquired) from the marker 3, a position on the travel route at which the operation is to be performed, the order and timing of the operation, etc. are determined. Accordingly, an operation program covering the entire travel route (a complex operation program in which positions on the travel route at which operations are to be performed, the order and timings of the operations, etc. are written) that is needed in an existing system becomes unnecessary.

With simple work of placing the marker 3 on the line 1, the travel route of the autonomous travel device 2 in the line 1 can be easily set. Even in a case where the travel route needs to be changed, the travel route can be easily changed by, for example, changing or adding the marker 3. Even in a case where the magnetic tape is, for example, added or re-affixed and the line 1 is partially changed, the travel route can be easily set or changed in accordance with the change in the line 1 by adding or changing the marker 3.

When a communication tag, such as an RFID, is used as the marker 3, the detection sensor 22 and the marker 3 can communicate with each other during a certain period in which the autonomous travel device 2 passes through the vicinity of the marker 3 (a period longer than a period during which the detection sensor 22 faces the marker 3). Therefore, even while the autonomous travel device 2 is traveling, operation control information recorded to the marker 3 can be acquired with high accuracy. Further, even if the operation control information is complex to some extent (for example, the operation control information includes an operation pattern), the information can be easily read via communication.

[2] Second Embodiment

In the autonomous travel system according to the first embodiment, immediately after operation control information has been acquired from the marker 3, the autonomous travel device 2 is caused to perform a predetermined operation based on the operation control information. However, the present invention is not limited to this. At a predetermined position P0 that is detected after operation control information has been acquired, the autonomous travel device 2 may be caused to perform the predetermined operation.

In a second embodiment, the control unit 23 may enter a preparatory state when operation control information is acquired from the marker 3 and may perform detection control for detecting the predetermined position P0. In a case where the control unit 23 detects the predetermined position P0 while the control unit 23 is in the preparatory state, the control unit 23 may control the operation of the autonomous travel device 2 on the basis of the operation control information acquired when the control unit 23 enters the preparatory state.

Figure 7:
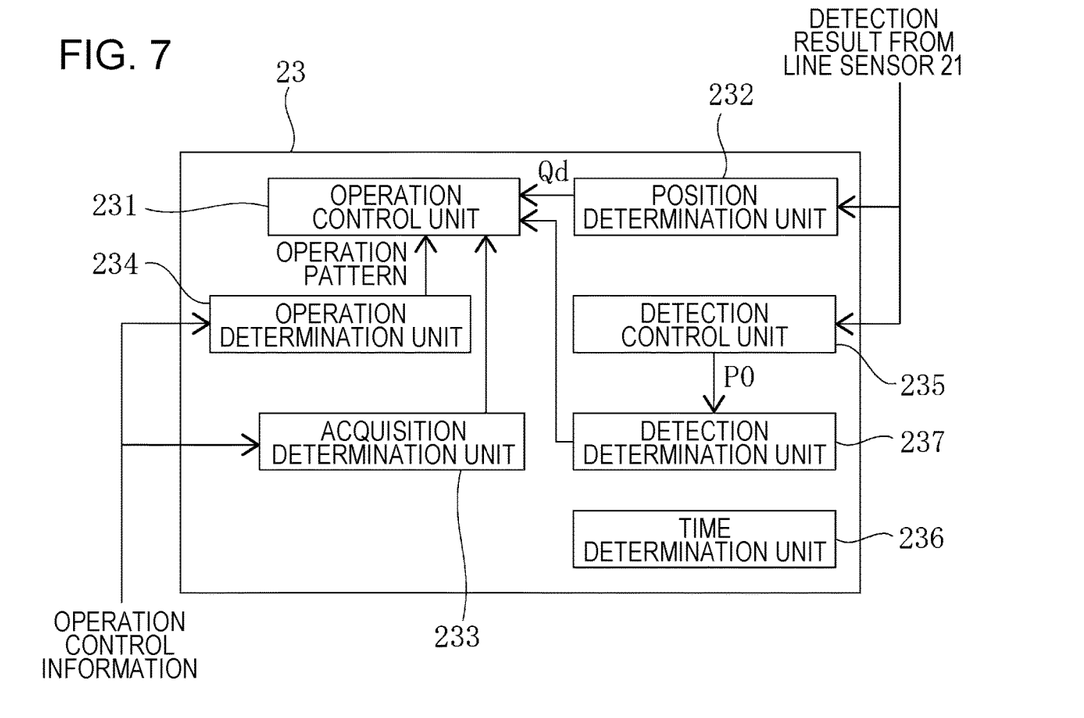
FIG. 7 is a block diagram illustrating a configuration of the control unit according to a second embodiment.
Figure 8:
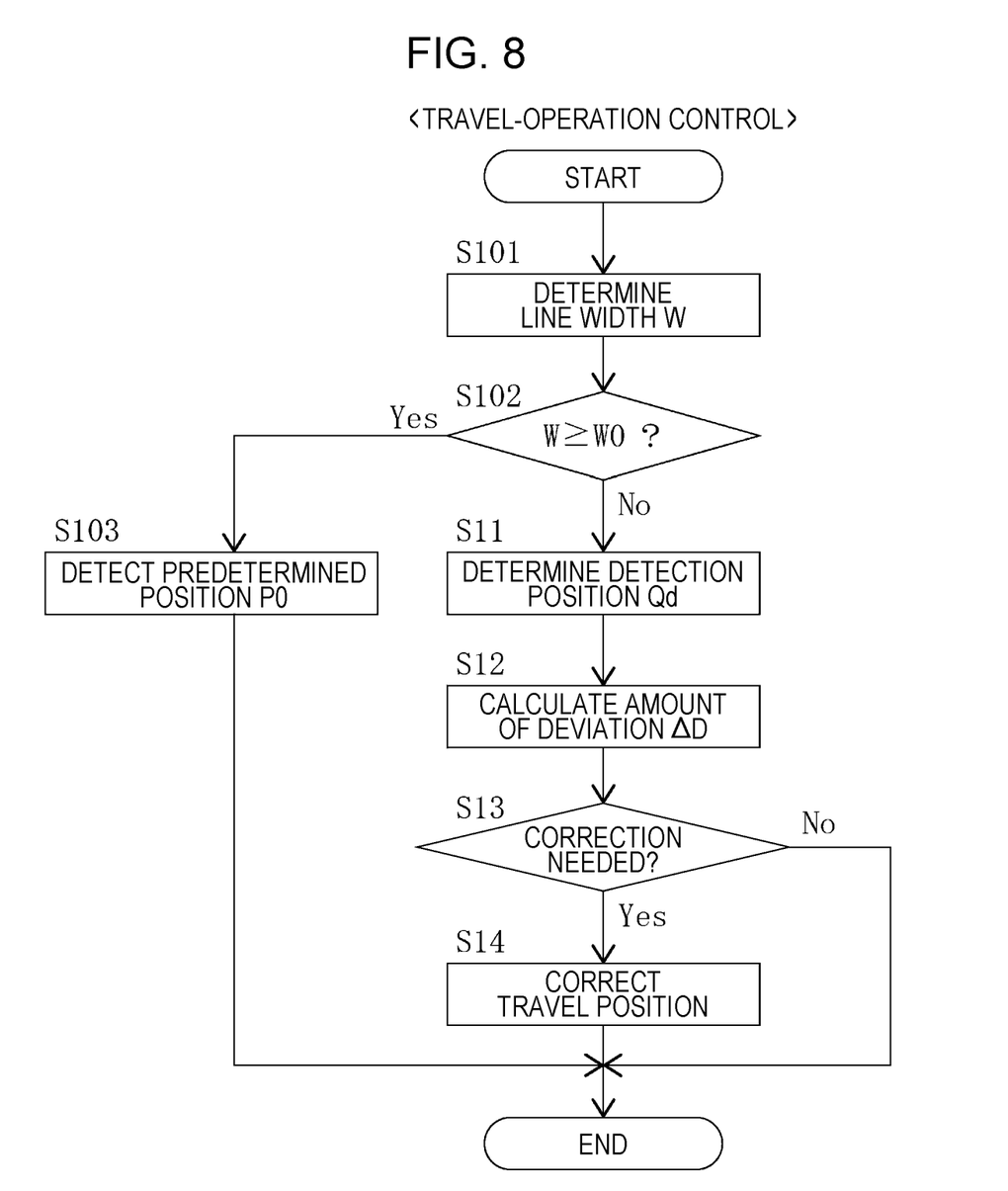
FIG. 8 is a flowchart illustrating a flow of travel-operation control performed by the control unit in the second embodiment.
Figure 9:
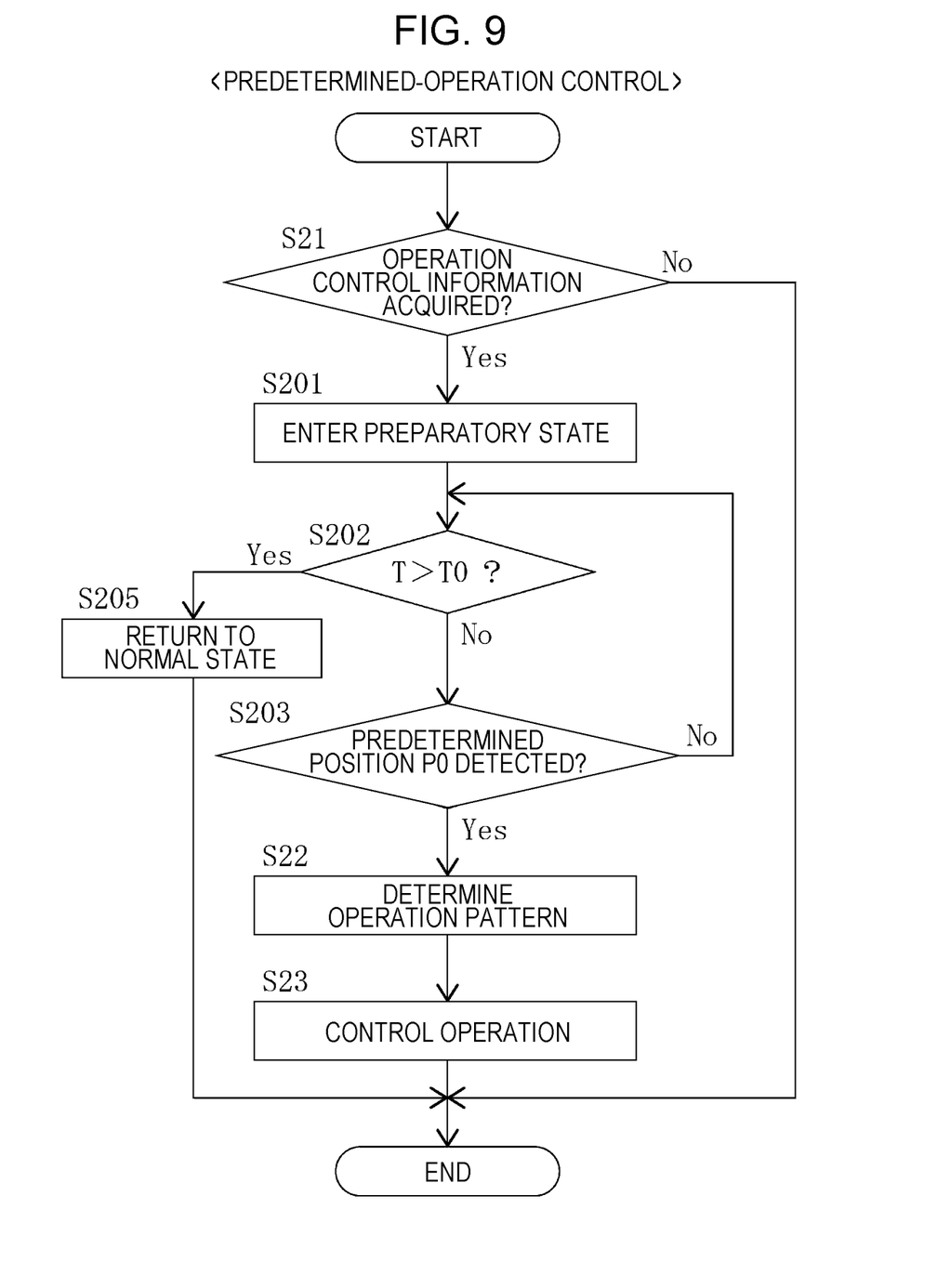
FIG. 9 is a flowchart illustrating a flow of predetermined-operation control performed by the control unit in the second embodiment.

FIG. 7 is a block diagram illustrating a configuration of the control unit 23 according to the second embodiment. As illustrated in FIG. 7, the control unit 23 further includes a detection control unit 235, a time determination unit 236, and a detection determination unit 237. The units in the control unit 23 perform processes to thereby perform operation control described below. FIG. 8 and FIG. 9 are flowcharts respectively illustrating a flow of travel-operation control and a flow of predetermined-operation control performed by the control unit 23 in the second embodiment.

(1) Travel-Operation Control

In the travel-operation control, the detection control unit 235 performs the following detection control. First, the detection control unit 235 determines the width W of the line 1 on the basis of a detection result from the line sensor 21 (detection signals from the detecting elements 21A) (step S101). Specifically, the detection control unit 235 determines the width W of the line 1 from the number of the detecting elements 21A that output detection signals (see FIG. 3).

Next, the detection control unit 235 determines whether the determined width W of the line 1 is equal to or larger than a predetermined reference width W0 (Yes or No) (step S102). If the determination by the detection control unit 235 results in No (the width W is smaller than the predetermined reference width W0) in step S102, the control unit 23 performs the process from step S1*l* to step S14 described in the first embodiment to thereby cause the autonomous travel device 2 to perform a travel operation.

On the other hand, if the determination by the detection control unit 235 results in Yes (the width W is equal to or larger than the predetermined reference width W0) in step S102, the detection control unit 235 detects the position of the autonomous travel device 2 at that time as the predetermined position P0 (step S103). The predetermined position P0 detected here is used in predetermined-operation control described below that is performed simultaneously with the travel-operation control.

Figure 10:
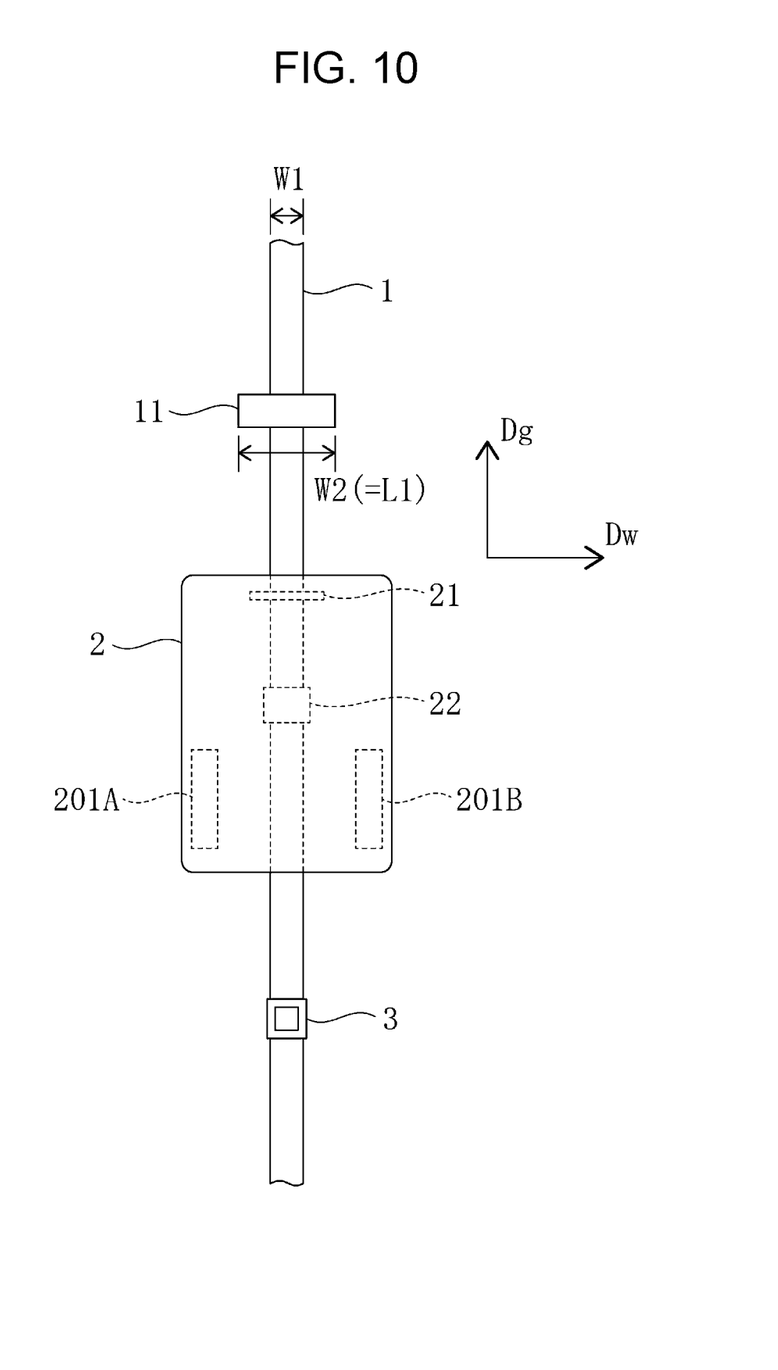
FIG. 10 is a schematic diagram illustrating an example of the autonomous travel system according to the second embodiment.

Detection of the predetermined position P0 by the detection control unit 235 as described above is implemented by forming the line 1 as described below. FIG. 10 is a schematic diagram illustrating an example of the autonomous travel system according to the second embodiment. As illustrated in FIG. 10, it is preferable that the line 1 partially have a widened portion 11 in which the width W is increased. The widened portion 11 can be formed by affixing a separate magnetic tape so as to cross the magnetic tape (having the width W1) that is affixed along the travel route, the separate magnetic tape having a length L1 that is larger than the width W1. In this case, in the widened portion 11, the line 1 has a width W2 (=length L) that is larger than the normal width W1.

When the predetermined reference width W0 is set to a value equal to or smaller than the width W2 and larger than the width W1, the determination by the detection control unit 235 resulting in Yes (the width W being equal to or larger than the predetermined reference width W0) in step S102 means that the widened portion 11 is detected. The detection control unit 235 detects the position at that time (the position of the widened portion 11) as the predetermined position P0 (step S103).

From the viewpoint of increasing the accuracy of detection by the detection control unit 235, it is preferable that the width W2 of the line 1 in the widened portion 11 be larger than the width of the line sensor 21. In this case, the predetermined reference width W0 can be set to the upper limit of the line width that can be detected by the line sensor 21 (which corresponds to the width of the line sensor 21), and the two widths W1 and W2 of the line 1 can be easily distinguished from each other.

(2) Predetermined-Operation Control

In the predetermined-operation control, if the determination by the acquisition determination unit 233 results in Yes (the detection sensor 22 acquires operation control information) in step S21, the control unit 23 enters the preparatory state while performing the travel-operation control (step S201).

After the control unit 23 has entered the preparatory state, the time determination unit 236 measures the time and determines whether the measured time T exceeds a predetermined time T0 (step S202). If the determination by the time determination unit 236 results in Yes (the measured time T exceeds the predetermined time T0) in step S202, the control unit 23 returns to a normal state from the preparatory state (step S205).

On the other hand, if the determination by the time determination unit 236 results in No (the measured time T does not exceed the predetermined time T0) in step S202, the detection determination unit 237 determines whether the detection control unit 235 detects the predetermined position P0 in step S103 in the travel-operation control (Yes or No) (step S203). Step S202 and step S203 are repeated until the determination by the detection determination unit 237 results in Yes (the detection control unit 235 detects the predetermined position P0) in step S203 or the determination by the time determination unit 236 results in Yes (the measured time T exceeds the predetermined time T0) in step S202.

If the determination by the detection determination unit 237 results in Yes (the detection control unit 235 detects the predetermined position P0) in step S203, the control unit 23 performs the process in step S22 and step S23 described in the first embodiment to thereby control the operation of the autonomous travel device 2 on the basis of the operation control information acquired when the control unit 23 enters the preparatory state to cause the autonomous travel device 2 to perform a predetermined operation corresponding to the operation control information.

If the determination by the acquisition determination unit 233 results in No (the detection sensor 22 does not acquire operation control information) in step S21, the control unit 23 remains in the normal state (the state other than the preparatory state) and causes the detection determination unit 237 to determine whether the detection control unit 235 detects the predetermined position P0 in step S103 in the travel-operation control (Yes or No). In the case of the normal state (in the case other than the case of the preparatory state), even if the determination by the detection determination unit 237 results in Yes (the detection control unit 235 detects the predetermined position P0), the control unit 23 does not perform the process in step S22 and step S23 described in the first embodiment or does not cause the autonomous travel device 2 to perform the predetermined operation. That is, the control unit 23 causes the autonomous travel device 2 to continuously perform the normal travel operation.

With the above-described autonomous travel system according to the second embodiment, the predetermined position P0 can be detected with high accuracy with the detection control described above. Therefore, when the predetermined position P0 is set to a position desired by the user (in this embodiment, when the widened portion 11 is formed at a position desired by the user), it is possible to cause the autonomous travel device 2 to perform a predetermined operation precisely at the desired position.

[3] Third Embodiment

Figure 11:
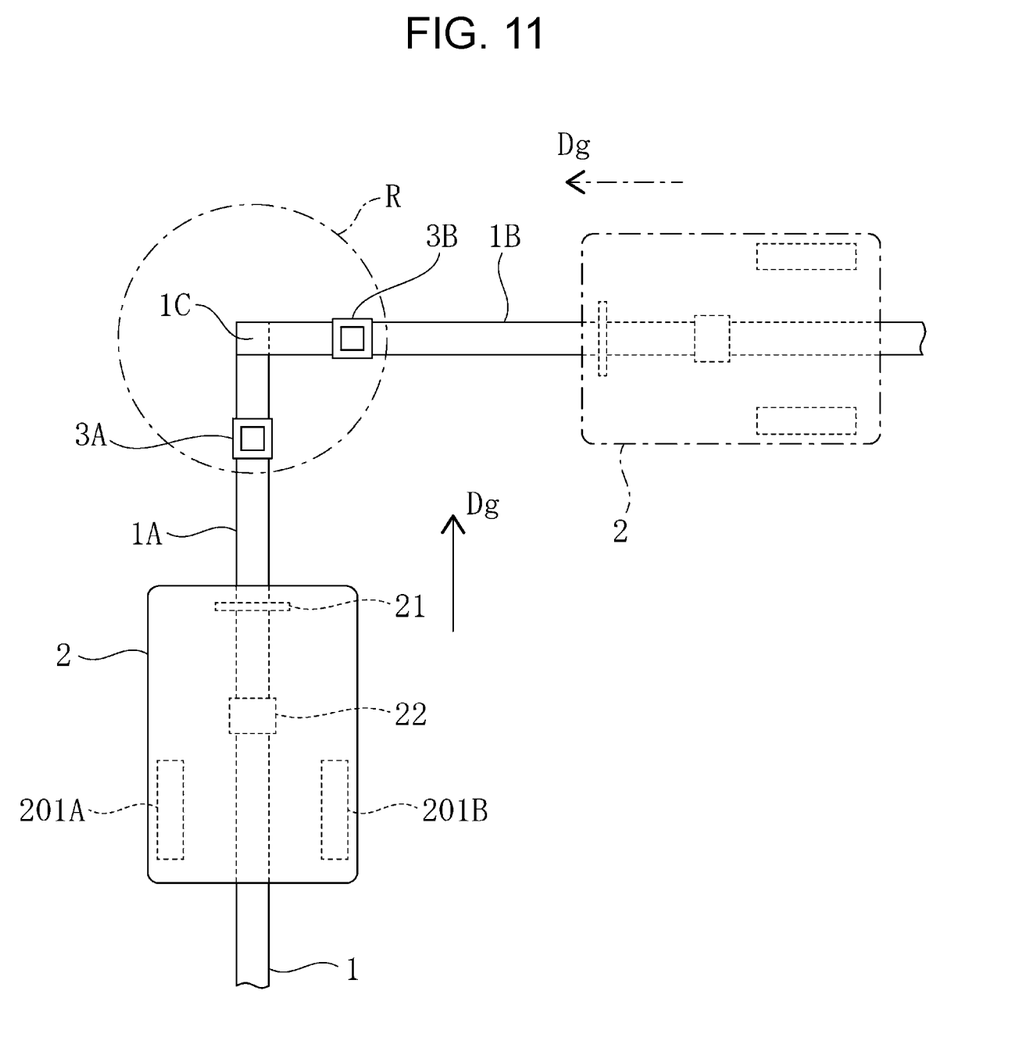
FIG. 11 is a schematic diagram illustrating the autonomous travel system according to a third embodiment.

FIG. 11 is a schematic diagram illustrating the autonomous travel system according to a third embodiment. As illustrated in FIG. 11, the line 1 may be formed on the travel route by affixing two magnetic tapes 1A and 1B that extend in different directions and intersect. In this case, the line 1 has a point of intersection 1C (for example, an intersection or a corner) at which the magnetic tapes 1A and 1B intersect.

In a case where the autonomous travel device 2 travels through the point of intersection 1C described above, a marker 3A and a marker 3B are respectively placed on the magnetic tape 1A and the magnetic tape 1B at respective positions within a predetermined area R that includes the point of intersection 1C. The marker 3A retains information (operation control information) about an operation of the autonomous travel device 2 that comes into the point of intersection 1C from the side of the magnetic tape 1A (in this embodiment, turning clockwise 90° at the point of intersection 1C). The marker 3B retains information (operation control information) about an operation of the autonomous travel device 2 that comes into the point of intersection 1C from the side of the magnetic tape 1B (in this embodiment, turning counterclockwise 90° at the point of intersection 1C).

In such a case, the autonomous travel device 2 that senses the marker 3A and turns clockwise at the point of intersection 1C senses the marker 3B when departing from the point of intersection 1C. To the contrary, the autonomous travel device 2 that senses the marker 3B and turns counterclockwise at the point of intersection 1C senses the marker 3A when departing from the point of intersection 1C. Therefore, unless some measure is taken, the autonomous travel device 2 may perform an erroneous operation when departing from the point of intersection 1C.

Accordingly, when the autonomous travel device 2 passes through the point of intersection 1C, it is preferable that the control unit 23 perform the following control. First, the control unit 23 controls the operation of the autonomous travel device 2 on the basis of operation control information acquired first by the detection sensor 22 from one of the plurality of markers 3 (in this embodiment, the markers 3A and 3B) placed within the predetermined area R. Thereafter, the control unit 23 ignores operation control information acquired by the detection sensor 22 from the other marker 3 (in this embodiment, the marker 3A or 3B) placed within the predetermined area R until the autonomous travel device 2 passes through and leaves the predetermined area R.

With the above-described autonomous travel system according to the third embodiment, an erroneous operation of the autonomous travel device 2 that passes through the point of intersection 1C can be prevented.

[4] Other Embodiments

In the autonomous travel system described above, the marker 3 is not limited to a communication tag, and a two-dimensional printed matter, such as a barcode or a QR code (registered trademark), may be used.

The descriptions of the embodiments given above are to be considered as illustrative and non-restrictive in all aspects. The scope of the present invention is defined not by the above-described embodiments but by the terms of the claims. Further, the scope of the present invention is intended to include any modifications within the meaning and scope equivalent to the terms of the claims.

REFERENCE SIGNS LIST 1 line
1a edge
1c center line
1A, 1B magnetic tape
1C point of intersection
2 autonomous travel device
2a bottom surface
3, 3A, 3B marker
11 widened portion
20 driving mechanism
21 line sensor
21A detecting element
22 detection sensor
23 control unit
24 storage unit
25 battery
201A left driving wheel
201B right driving wheel
202 guide wheel
203A left motor
203B right motor
231 operation control unit
232 position determination unit 233 acquisition determination unit
234 operation determination unit
235 detection control unit
236 time determination unit
237 detection determination unit
Dg direction of travel
Dw width direction
L1 length
P0, Q0 predetermined position
Qd detection position
R predetermined area
T measured time
T0 predetermined time
W, W1, W2 width
W0 reference width
d0 predetermined value

The invention claimed is:

1. An autonomous travel system comprising:
an autonomous travel device;
a line for guiding travel that is placed on a travel route traveled by the autonomous travel device; and
a marker to which operation control information related to an operation of the autonomous travel device is recorded so as to be readable and that is placed on the travel route,
the autonomous travel device including
a detection device that detects the line,
an acquisition device that acquires the operation control information from the marker, and
a control processor that controls an operation of the autonomous travel device on the basis of a detection result from the detection device and the operation control information acquired by the acquisition device;
wherein
the control processor enters a preparatory state when the acquisition device acquires the operation control information, and performs detection control for detecting a predetermined position at which the autonomous travel device is caused to perform a predetermined operation based on the operation control information,
in a case where the control processor detects the predetermined position with the detection control while the control processor is in the preparatory state, the control processor controls the operation of the autonomous travel device on the basis of the operation control information acquired when the control processor enters the preparatory state, and
in the detection control, the control processor determines a width of the line on the basis of a detection result from the detection device and, in a case where the determined width of the line is equal to or larger than a predetermined reference width, detects a position at which the autonomous travel device is located when the width of the line is determined to be equal to or larger than the predetermined reference width as the predetermined position.

2. The autonomous travel system according to claim 1, wherein
the line includes two lines that are placed on the travel route so as to extend in different directions and to intersect at a point of intersection, and the marker includes a plurality of markers that are placed within a predetermined area including the point of intersection, and
when the autonomous travel device passes through the point of intersection, the control processor controls the operation of the autonomous travel device on the basis of the operation control information acquired first by the acquisition device from one of the plurality of markers placed within the predetermined area, and ignores the operation control information acquired by the acquisition device from another one of the plurality of markers placed within the predetermined area until the autonomous travel device passes through and leaves the predetermined area.

* * * * *